Patented Sept. 10, 1929.

1,727,639

UNITED STATES PATENT OFFICE.

ALFRED W. GAUGER, OF TOTTENVILLE, AND HENRY HERMAN STORCH, OF NEW YORK, N. Y., ASSIGNORS TO BURNHAM CHEMICAL COMPANY, OF RENO, NEVADA, A CORPORATION OF NEVADA.

PROCESS OF OBTAINING SODIUM TETRABORATE.

No Drawing.   Application filed March 2, 1926.   Serial No. 91,810.

The invention relates to a method of recovering sodium tetraborate or borax from saline liquors containing the same and other salts.

An object of the invention is to provide a process of obtaining a large yield of borax from saline liquors, such as Searles Lake brine.

The invention possesses other advantageous features, some of which with the foregoing, will be set forth at length in the following description, where we shall outline in full the preferred form of the process of our invention.

We shall describe our process as it is practiced with the brine occurring subterraneously at Searles Lake, California, and which brine is a liquor containing sodium, potassium, carbonate, sulfate, chloride and borate ions and other substances, but it is to be understood that our process is also applicable to other saline liquors.

Searles Lake brine is similar in many respects to an ordinary saline solution and behaves generally in a similar manner, but probably, due to the continuous association and dissociation of the various ions and molecules it contains, fractional crystallization is complicated and any one or more of a number of salts may crystallize out at a given concentration of the liquor, depending upon other factors. The brine is saturated with sodium chloride and this salt crystallizes out on concentration of the brine by evaporation, and is usually the first salt to crystallize out.

It has been found that the borate ions in the brine associate themselves with the other ions to form sodium tetraborate (borax) and sodium metaborate. Due to the high solubility of sodium metaborate, this salt may not be readily crystallized out of the brine, whereas sodium tetraborate may be readily crystallized out. Since a large proportion of the borate ions are in association to form sodium metaborate, which cannot be crystallized out, it follows that in crystallizing out and recovering the sodium tetraborate, only a fraction of the borate ions in the brine are recovered. It is desirable to recover from the brine as large an amount of sodium tetraborate as is practical and this we accomplish by converting sodium metaborate in the brine to sodium tetraborate and crystallizing out the tetraborate, thus increasing the yield of the borate salt. We have found that the solubility of sodium tetraborate in the brine is increased by the presence of sodium carbonate and that by reducing the concentration of carbonate ions the solubility of borax is likewise decreased. It is therefore an object of this invention to reduce the carbonate ion concentration of the brine to cause the borate ions to form sodium tetraborate which may be readily recovered from the brine.

Broadly considered, the process of our invention comprises increasing the yield of borax from a brine by prior removal of part of the carbonate ion content. This may be accomplished in any suitable manner but is preferably effected by concentrating a brine containing sodium, chloride, carbonate, sulfate and borate ions to crystallize out a substantial amount of sodium chloride, then treating the brine to crystallize out sodium carbonate sulfate and then treating the brine to crystallize out sodium tetraborate. This process is preferably carried out under variable atmospheric conditions of wind and temperature, but may be carried out by the use of artificial heat when desired. In practicing our invention with Searles Lake brine, the crude subterranean brine is pumped into a large deep pond to be evaporated by the action of the sun and wind. As the brine becomes more and more concentrated, sodium chloride crystallizes out and the crystals gather on the bottom and sides of the pond from which they may be removed by any of the usual methods. Since the volume of the pond is large, in proportion to the area exposed, its temperature remains practically constant during the day and night and is usually in the neighborhood of from twenty to twenty-five (20 to 25) degrees centigrade. The concentration in the large deep pond is continued until the brine becomes saturated or substantially saturated, at its existing temperature, with potassium sodium sulfate which may occur as $KNaSO_4$ or $K_3Na(SO_4)_2$ or $K_4Na_2(SO_4)_3$. The brine is then treated to crystallize out sodium carbonate sulfate. This is preferably accomplished by raising the temperature of the brine to a temperature above thirty degrees (30°) centigrade, and preferably as high as possible by solar heat which causes the sodium carbonate sulfate to crystallize out and prevents the crystallization of sodium potassium sulfate which becomes more soluble at the higher temperature. If the temperature rise of the brine is accomplished without further evaporation thereof, sodium chloride will not crystallize out with the sodium carbonate sulfate.

This is usually effected by flowing the brine from the deep pond into a shallow pond, usually of from two to six inches in depth, wherein, upon exposure of the brine to the sun, the temperature of the liquor is quickly raised to the desired magnitude, causing sodium carbonate sulfate to crystallize out. Initially, there will be evaporation in the shallow pond, causing the formation of a salt crust over the surface of the pond, thereby minimizing subsequent evaporation. The slight depth of the second pond precludes the possibility of any but gentle surface disturbances which will not break the crust.

The brine from the deep pond is flowed through the shallow pond, under the crust thereon, accomplishing the heating of the brine to the temperature which causes sodium carbonate sulfate to crystallize out and the presence of the salt crust minimizes the evaporation so that a minimum of sodium chloride is crystallized out.

The crystallized sodium carbonate sulfate gathers on the bottom and sides of the shallow pond from which is may be gathered by any convenient means. By crystallizing out the sodium carbonate sulfate, the carbonate ion content of the brine is reduced so that the borate ions associate themselves with the other ions to form a larger proportion of sodium tetraborate, reducing the proportion of sodium metaborate in the brine.

The brine remaining after the sodium carbonate sulfate has crystallized out, is then cooled or cooled and agitated to crystallize out sodium tetraborate. Various means may be used to effect the cooling of the brine and one which has been found satisfactory is to expose the brine in shallow ponds to the nocturnal atmosphere. When the brine reaches its lowest temperature during the night, it is agitated in any convenient manner such as by conducting it through a pump, whereby sodium tetraborate crystallizes out. The borax may subsequently be recovered in any suitable manner.

It will be seen that by virtue of this process the yield of sodium tetraborate from Searles Lake brine is greatly increased by removing carbonate ions from the solution prior to the crystallization out of the borate ions, the removal of the carbonate ions serving to increase the proportion of sodium tetraborate to sodium metaborate in the brine.

We claim:

1. The method of obtaining borax from brine containing sodium, potassium, borate, carbonate, chloride and sulfate ions which comprises first bringing the brine to saturation with potassium sodium sulfate, subsequently raising the temperature of the brine to crystallize out sodium carbonate sulfate only and then treating the brine to crystallize out borax.

2. The method of obtaining borax from brine containing sodium, potassium, borate, carbonate, chloride and sulfate ions which comprises first bringing the brine to saturation with potassium sodium sulfate, at a temperature below 25° centigrade, subsequently raising the temperature of the brine to above 30° centigrade to crystallize out sodium carbonate sulfate only and then treating the brine to crystallize out borax.

3. The method of obtaining borax from brine containing sodium, potassium, borate, carbonate, chloride and sulfate ions which comprises first bringing the brine to saturation with potassium sodium sulfate at the temperature of evaporation, subsequently raising the temperature of the brine to crystallize out sodium carbonate sulfate only, separating the brine from the deposited crystals and cooling the brine to crystallize out borax.

4. The method of obtaining borax from brine containing sodium, potassium, borate, carbonate, chloride and sulfate ions which comprises first bringing the brine to saturation with potassium sodium sulfate, at a temperature below 25° C., subsequently raising the temperature of the brine to above 30° C. to crystallize out sodium carbonate sulfate only, separating the brine from the deposited crystals and cooling the brine to crystallize out borax.

5. The method of obtaining borax from brine containing sodium, potassium, borate, carbonate, chloride, and sulfate ions which comprises evaporating the brine at a low temperature to crystallize out sodium chloride, separating the crystallized sodium chloride from the brine, heating the brine without appreciable further evaporation to crystallize out sodium carbonate sulfate, separating the crystallized sodium carbonate sulfate from the brine, cooling the brine to crystallize out borax, and separating the borax crystals from the brine.

6. The method of obtaining borax from brine containing sodium potassium, borate, carbonate, chloride, and sulfate ions which comprises evaporating the brine to crystallize out sodium chloride, heating the brine out of contact with the atmosphere and above the temperature of maximum solubility of sodium carbonate sulfate, and cooling the brine to crystallize out borax.

7. The method of obtaining borax from brine containing sodium, potassium, borate, carbonate, chloride, and sulfate ions which comprises evaporating the brine at a low temperature to crystallize out sodium chloride, heating the remaining brine substantially without evaporation to crystallize out sodium carbonate sulfate, and cooling the then remaining brine to crystallize out borax.

In testimony whereof we have hereunto set our hands.

ALFRED W. GAUGER.
HENRY HERMAN STORCH.